US012688068B1

(12) United States Patent (10) Patent No.: US 12,688,068 B1
Gujral et al. (45) Date of Patent: Jul. 21, 2026

(54) DYNAMICALLY DETERMINING SHARED COMPUTING RESOURCES FOR EXECUTING ACTIONS IN AN APPLICATION WORKFLOW CONFIGURATION

(71) Applicant: Amazon Technologies, Inc., Seattle, WA (US)

(72) Inventors: Nitin Gujral, Bothell, WA (US); Mike Paul Spertus, Chicago, IL (US); Ranjith Ramakrishnan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 925 days.

(21) Appl. No.: 17/810,300

(22) Filed: Jun. 30, 2022

(51) Int. Cl.
G06F 9/50 (2006.01)
G06F 8/60 (2018.01)

(52) U.S. Cl.
CPC .............. G06F 9/5038 (2013.01); G06F 8/60 (2013.01); G06F 9/5033 (2013.01)

(58) Field of Classification Search
CPC ......... G06F 9/5038; G06F 8/60; G06F 9/5033
See application file for complete search history.

(56) References Cited

U.S. PATENT DOCUMENTS

| | | | | |
|---|---|---|---|---|
| 9,311,144 | B1* | 4/2016 | Krishnamoorthy | G06F 16/93 |
| 2017/0017522 | A1* | 1/2017 | Daga | G06F 9/46 |
| 2021/0294732 | A1 | 9/2021 | Underseth | |
| 2022/0131865 | A1 | 4/2022 | Lev Ran et al. | |
| 2022/0318067 | A1* | 10/2022 | Nayak | G06F 9/542 |

OTHER PUBLICATIONS

GitHub Actions, "Using environments for deployment", published Jun. 30, 2022, https://docs.github.com/en/actions/deployment/targeting-different-environments/using-environments-for-deployment, pp. 1-8.

* cited by examiner

*Primary Examiner* — Jorge A Chu Joy-Davila
(74) *Attorney, Agent, or Firm* — S. Scott Foster; Kowert, Hood, Munyon, Rankin & Goetzel, P.C.

(57) ABSTRACT
Shared computing resources may be determined for executing actions in an application workflow configuration. An application workflow configuration that describes a workflow that includes actions with respective action code executable to perform the actions may be obtained. Execution of the workflow may be directed according to the application workflow configuration. As part of execution of the workflow, an assignment of two of the actions may be individually determined for a same computing resource. Execution of the respective action code for the two actions may be caused according to the same computing resource.

20 Claims, 9 Drawing Sheets

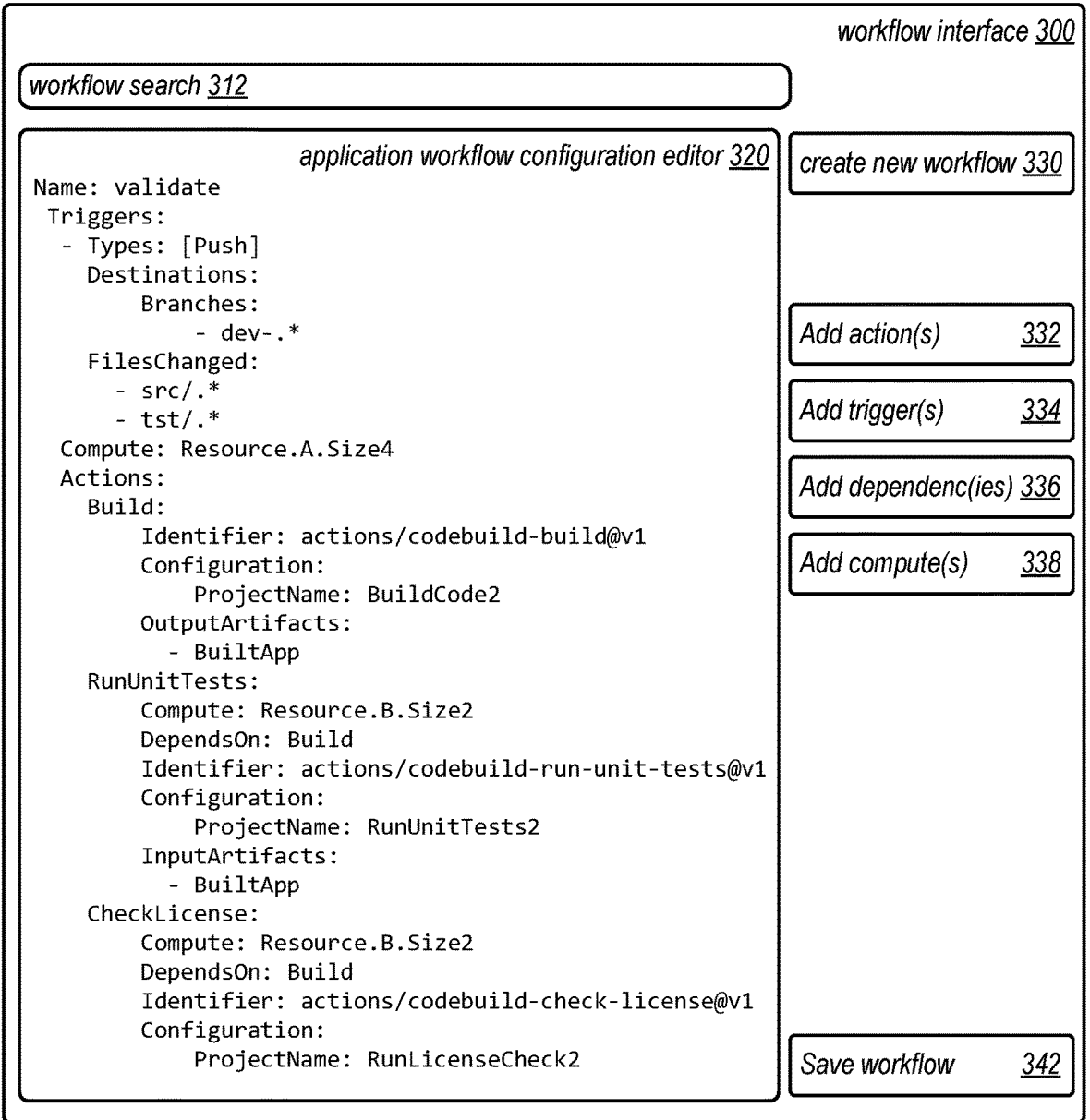

```
                                          workflow interface 300 workflow search 312 application workflow configuration editor 320     create new workflow 330
  Name: validate
   Triggers:
    - Types: [Push]
      Destinations:
          Branches:
              - dev-.*                                            Add action(s)        332
      FilesChanged:
        - src/.*
        - tst/.*                                                  Add trigger(s)       334
  Compute: Resource.A.Size4
  Actions:                                                        Add dependenc(ies) 336
    Build:
        Identifier: actions/codebuild-build@v1                    Add compute(s)       338
        Configuration:
            ProjectName: BuildCode2
        OutputArtifacts:
          - BuiltApp
    RunUnitTests:
        Compute: Resource.B.Size2
        DependsOn: Build
        Identifier: actions/codebuild-run-unit-tests@v1
        Configuration:
            ProjectName: RunUnitTests2
        InputArtifacts:
          - BuiltApp
    CheckLicense:
        Compute: Resource.B.Size2
        DependsOn: Build
        Identifier: actions/codebuild-check-license@v1
        Configuration:
            ProjectName: RunLicenseCheck2                         Save workflow        342
```

FIG. 3A

```
application workflow configuration 372

Compute: Resource.A.Size1

Actions:
     Action1:
         ...
     Action2:
         Compute: Resource.B.Size2
         DependsOn: Action1
         ...
     Action3:
         DependsOn: Action1
         ...
     Action4:
         DependsOn: Action1
```

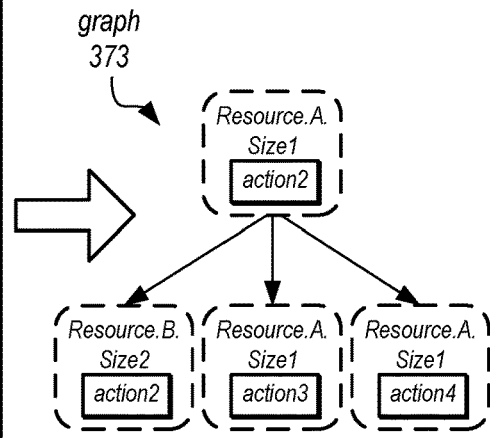

graph 373

```
application workflow configuration 374

Compute: Resource.A.Size1

Actions:
     Action1:
         ...
     Action2:
         DependsOn: Action1
         ...
     Action3:
         Compute: Actions.Action1.Compute
         DependsOn: Action1
         ...
     Action4:
         Compute: Actions.Action1.Compute
         DependsOn: Action1
```

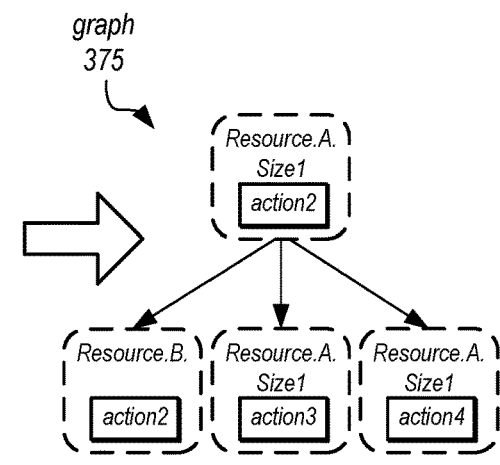

graph 375

```
application workflow configuration 376

ComputeOptimization: Enabled

Actions:
     Action1:
         ...
     Action2:
         DependsOn: Action1
         ...
     Action3:
         DependsOn: Action1
         ...
     Action4:
         DependsOn: [Action2, Action3]
```

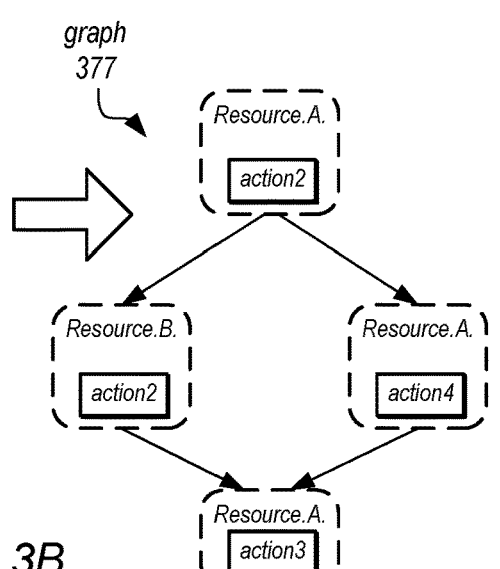

graph 377

*FIG. 3B*

DYNAMICALLY DETERMINING SHARED COMPUTING RESOURCES FOR EXECUTING ACTIONS IN AN APPLICATION WORKFLOW CONFIGURATION

BACKGROUND

Workflow management systems provide various users with the ability to define and execute workflows across multiple different systems, services, or applications. For example, workflows may be involved in the performance of various service or application development, building, deployment and maintenance, where one or more workflows may be used to, for example, deploy a new version of a service or system. Various controls for defining when and how workflows may be supported by workflow management systems, providing users with many different controls for defining the performance of workflows.

BRIEF DESCRIPTION OF THE DRAWINGS

FIG. 3A is an example graphical user interface for specifying an application workflow configuration, according to some embodiments.

FIG. 3B illustrate examples of application workflow configurations, according to some embodiments.

Figure 1:
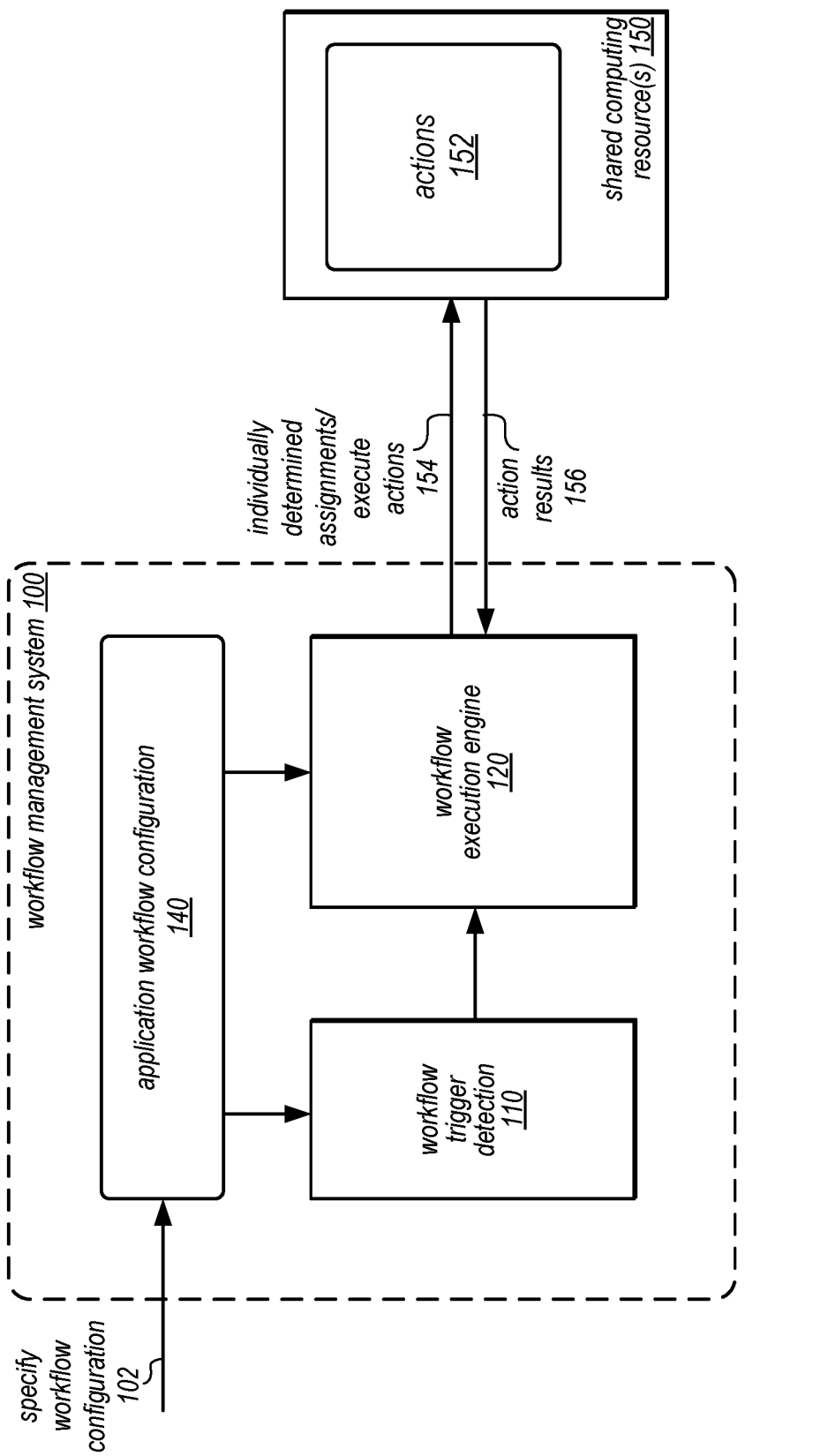
FIG. 1 is a logical block diagram illustrating shared dynamically determining shared computing resources for executing actions in an application workflow configuration, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for dynamically determining shared computing resources determined for executing actions in an application workflow configuration are described. Spinning up compute for actions is an expensive operation. Actions performed as part of workflows are a form of compute based action, where the action itself performed using input, commands and output on top of compute executing corresponding action code. If executing compute based actions within a workflow system were to always utilize a new computing resource before the action, such a technique would quickly become resource intensive, increasing costs and potentially wasting computing resources that could be used to perform other tasks.

Unlike techniques that specify computing resource assignments to actions collectively (e.g., for an entire job or other grouping of actions), techniques that individually determine computing resource assignments at run-time may allow developers or the system itself to identify and using shared computing resources in an application workflow when optimal (e.g., to increase parallelization) on a per-action basis.

Actions running on the same computing resource may share execution context amongst themselves. An example execution context can contain (but is not limited to) source inputs (e.g., primary and secondary) of a current operating directory (e.g., a workspace), pre-defined output directories, and mutable action and workflow variables. This execution context may be what is shared between actions on the same computing resource. Techniques for individually determining computing resource assignments at run-time, as described in various embodiments, may allow application workflow authors to chain actions according to dependencies specified in an application workflow configuration in order to reduce action interactions/dependencies (like artifacts and variables) according individual action assignments whether to shared or individual computing resources.

FIG. 1 is a logical block diagram illustrating shared computing resources determined for executing actions in an application workflow configuration, according to some embodiments. Workflow management system 100 may be a standalone system or implemented as part of a larger service, such as application development, build, delivery, and deployment service 210 discussed below with regard to FIG. 2.

Workflow management system 100 may store or have access to application workflow configuration 140, which may be specified as indicated at 102, and include the various examples discussed below with regard to FIGS. 3A, 3B, and 6, which may be a file, document, or other artifact which may be specified in various languages (e.g., Yet Another Markup Language (YAML)) or other formats to specify various features of a workflow. For example, an application workflow configuration may specify various actions such as the configuration for the action, like inputs, outputs, language, permissions, or execution entrypoint. The location or identification of action code that executes the action may also be specified. Application workflow configuration 140 may also specify trigger events that are used to cause execution of the workflow.

Individual action assignments computing resources may be made in various embodiments. For example, statements that assign a particular computing resource to an action may be made in application workflow configuration 140. These assignments may reference a specific computing resource or reference a specific type of computing resource. As discussed below with regard to FIGS. 3A-3B, some may reference another action in order to inherit or otherwise invoke the dependency described in the application workflow configuration 140 (e.g., as depicted by the various dependency graphs discussed below). In this way, a user can still control sharing between specific actions according to the inherency without, for instance, requiring an explicit assignment to a particular resource itself (e.g., use action A's resource for action B, instead of making the assignment be use resource 123 for Action B and user resource 123 for action A. In some embodiments, dynamic optimization may be specified in application workflow configuration which may allow for workflow execution engine 120 to make those individual assignments to computing resources using an optimization objective (e.g., for increased workflow performance, such as faster execution, resource utilization conservation, such as reusing as many computing resources as possible, or various other types of optimization objects (e.g., cost optimization in terms of resource usage or other factors that are used to determine cost values).

Workflow trigger detection 110 may detect trigger events specified in application workflow configuration 140 and start execution at workflow execution engine 120. As discussed in detail below, application workflow configuration 140 may include various statements or features that are used to assign actions to shared computing resources. For example, as discussed in detail with regard to FIGS. 6 and 7, workflow execution engine 120 may determine which computing resources may be shared according to statements in application workflow configuration 140 and/or other information (e.g., dynamically). Assignments to execute actions 154 may be made for actions individually at run-time, as indicated at 154. This may allow for either a user's choice as specified in application workflow configuration 140 to specify individual action computing resource assignments or dynamic optimization to be implemented so that multiple actions 152 are performed on a shared computing resource 150, when desired (instead of techniques that have to specify action/resource sharing on a per-group basis). The action results may be provided, as indicated at 156 and then used to determine or direct other action performance or determine that the workflow is complete.

Please note, FIG. 1 is provided as logical illustrations of a workflow management system, and is not intended to be limiting as to the physical arrangement, size, or number of components, modules, or devices to implement such features.

The specification first describes an example network-based application development and delivery service that performs dynamically determining shared computing resources determined for executing actions in an application workflow configuration. Included in the description of the example network-based application development and delivery service are various aspects of the example network-based application, build delivery, and development service. The specification then describes flowcharts of various embodiments of methods for dynamically determining shared computing resources determined for executing actions in an application workflow configuration. Next, the specification describes an example system that may implement the disclosed techniques. Various examples are provided throughout the specification.

Figure 2:
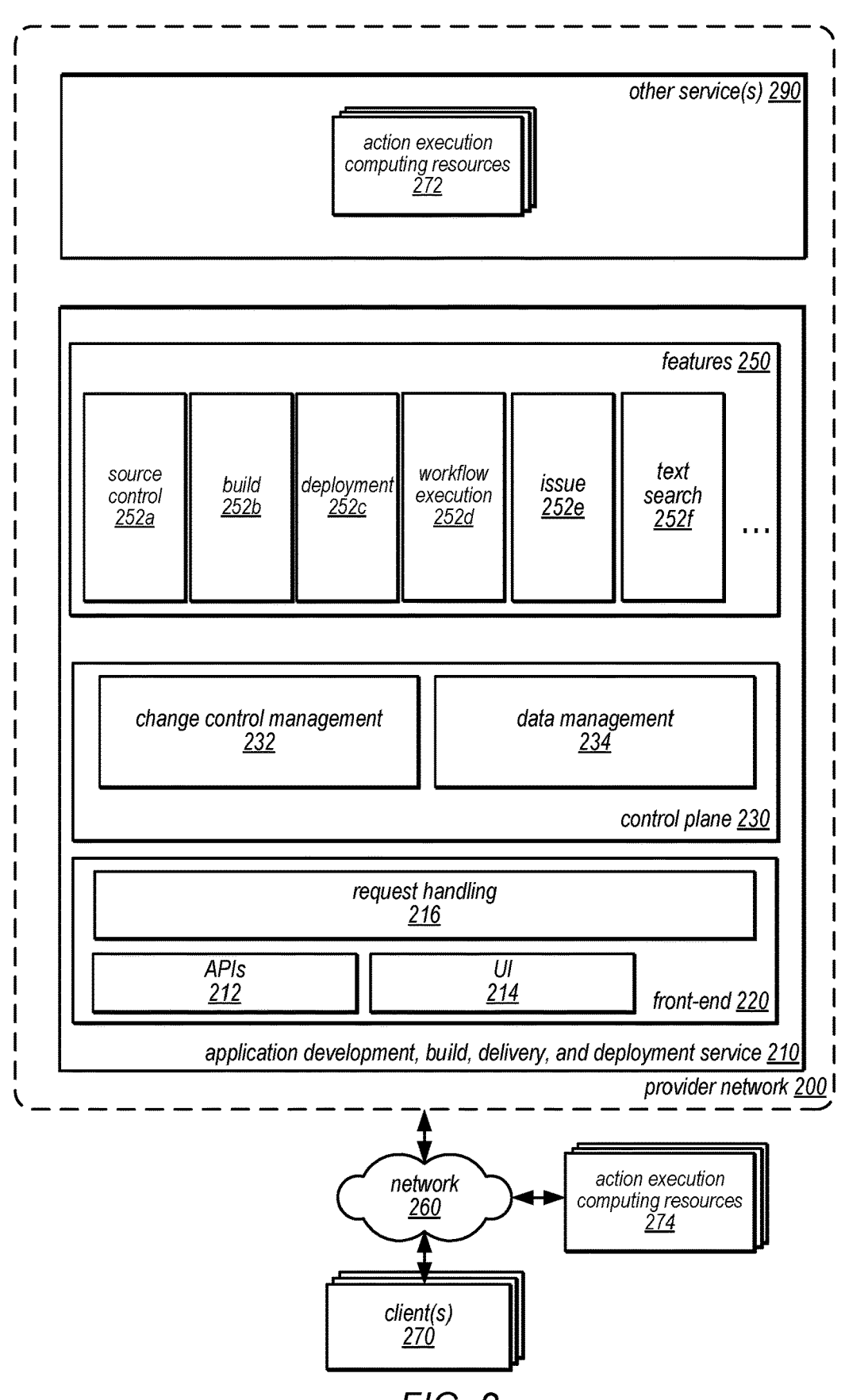
FIG. 2 is a logical block diagram illustrating a provider network that may implement an application development, build, deployment, and delivery service that implements dynamically determining shared computing resources for executing actions in an application workflow configuration, according to some embodiments.

FIG. 2 is a logical block diagram illustrating a provider network that may implement an application development, build, deployment, and delivery service that implements shared computing resources determined for executing actions in an application workflow configuration, according to some embodiments. Provider network 200 may be formed as a number of regions, where a region is a separate geographical area in which the cloud provider clusters data centers. Each region may include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 100 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region.

This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as computation and storage hosts, control plane components as well as external networks, such as network (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients, may be attached to the overlay network so that when a client provides an IP address that they want to send packets to, the IP address is run in virtual space by communicating with a mapping service that knows where the IP overlay addresses are.

Provider network 200 may implement many services, such as other services 290 that provide various types of computing, storage, management, network, or other services. As discussed in detail with regard to FIGS. 2-5, provider network 200 may implement application development, build, delivery, and deployment service 210 that enables developers to plan, write, test, and deliver software as part of a team or engineering organization. Various features of application development, build, delivery, and deployment service 210 may enable more developers to deliver efficiently, safely, and quickly. Application development, build, delivery, and deployment service 210 may offer various tools and capabilities (as well as allowing developers to add, adapt or implement further tools) that developers need to accomplish their tasks. As developers continue to use the tools of application development, build, delivery, and deployment service 210, various features may support the integration of development projects with an developing organization's standards, expanding the usage to more and more teams of the organization. Application development, build, delivery, and deployment service 210 may, in some embodiments, provide a web client that lives outside provider network 200's management console, a developer identity and authorization system that supports both individual and workforce identities, and an end-to-end developer toolchain that improves on existing solutions in terms of breadth and by making it easy for developers to successfully achieve software development velocity and quality at scale due to the extensibility and scalability offered by system features such as change control management 232 and data management 234.

Application development, build, delivery, and deployment service 210 may utilize various tools and other services as building blocks to provide core functionality and a web UI to deliver a unified end-to-end experience. Some features of application development, build, delivery, and deployment service 210 will allow developers to centralize management of their software development projects, including access control, easy implementation of software development life cycle (SDLC) best practices, auditing, and software provenance tracking. The set of capabilities provided by these features may include the ability to execute workflows, define and enforce best practices, and track compliance.

Application development, build, delivery, and deployment service 210 may provide centralized data management and change control systems, which may standardize and simplify how data is shared between systems owned by different teams. This should allow the overall experience to feel more unified regardless of our organization's structure, while also simplifying the implementation of features that were historically difficult to build, such as a "track changes" view with near-real-time updates from across the toolchain, or a personalized activity dashboard that spans product areas.

Application development, build, delivery, and deployment service 210 may use a set of tools (e.g., different services) or other features that can act as or utilize respective plugins developed and operated by for the different tools (e.g., source, artifacts, build, test, deploy, issues). The plugins may integrate may integrate with the tools to expose their functionality to end users. The platform services include a web UI 214 framework based on a micro-frontend architecture and a shared API layer. Application development, build, delivery, and deployment service 210 a data management system to facilitate data sharing across tools—and change control management that standardizes the way users perform mutating actions in application development, build, delivery, and deployment service 210.

Application development, build, delivery, and deployment service 210 may implement interface 220 which may include various features for interacting including Application Programming Interfaces (APIs) 212 and a User Interface. For example, APIs 212 may be implemented as a Software Development Kit (SDK) which may include operations to create, read, update, and/or delete various documents which are authored as part of Application development, build, delivery, and deployment service 210. User interface (UI) may be a web, or other graphically based, development environment that allows for various features, including leveraging a micro-front-end framework for packaging and routing client-side applications, text searches, as well as updates that cause index updates may be received or performed through APIs 212 and/or other user interfaces of application development, build, delivery, and deployment service 210.

Control plane 230 may be implemented as part of application development, build, delivery, and deployment service 210 and may include change control management 232 and data set management 234. Data set management 234 may accept data from data providers, manage schemas for the data, manage subscriptions for data consumers and store non-authoritative copies of the data, as discussed in detail below with regard to FIG. 3. Change control management 232 may manage potential changes that can be pre-evaluated, mediate between change approvers, and change performers, and maintain an authoritative reference to the desired state of each resource under its governance.

As noted earlier, plugins may include plugins 242a, 242b, 242c, 242d and 242e, which may bused to access various development tools, such as features 250, including but not limited to source control 252a, build 252b, deployment 252c, workflow execution 252d, issue handling 252e, and text search 252f. Plugins may include web service APIs for change control management 232 and data set management 234 as well as callbacks (similar to webhooks) invoked by those components. Plugins can run on their own infrastructure, and can use whatever technologies wanted to develop plugins; plugins can run on various execution resources in provider network 200 (e.g., various compute or other services). Plugin authors will be able to use generated clients to call change control management 232 and data set management 234 APIs, and for first-party plugins they will be able to use an authorization service to authenticate directly to these systems. At the same time, change control management 232 will pass along the details of the authenticated end user to plugins when changes are requested. Plugin responsibilities may be defined in terms of what document schemas they work with; they may consume some schemas, produce others, and enact changes for the documents they claim responsibility for. Plugins may use registration APIs to indicate which schemas they handle or subscribe to, as discussed below with regard to FIG. 3. This model allows significant flexibility for adding or improving tools, while keeping a consistent experience and facilitating cross-cutting features like governance and data sharing.

Application development, build, delivery, and deployment service 210 may provide a unified end-to-end developer toolchain with governance controls that enable organizations to empower their development teams to deliver software to production with confidence. In order to implement useful governance controls, change control management 232 and data management 234 may allow application development, build, delivery, and deployment service 210 to process information from the end-to-end toolchain in order to present actionable insights to end users as well as make automated decisions about changes according to user-configured policies. As each tool may be completely independent and manages its own data implementing change control management 232 and data management 234 may support combining information from across different tools without disrupting the roadmaps or API designs of the individual tool developers that provide the authoritative data.

Change control management 232 may provide a centralized system to orchestrate policy evaluation and change enactment. Each tool 250 may have its own APIs for enacting changes, with varying styles and capabilities (e.g., put vs. update APIs, declarative vs. imperative models, divergent capabilities for injecting approval requirements, etc.). Change control management 232 may provide a common way to access toolchain data to aid integrations into development, build, delivery, and deployment service 210 and a single place to contribute their own data. Change control management 232 allows for an interface to gain influence over the entire toolchain (subject to customer-defined rules and authorization, in some scenarios).

In some embodiments, clients of change control management 232 and data management 234 (aside from these two systems themselves) may be considered a plugin (e.g., various features 250). A plugin may be a component that is doing some combination of producing data, consuming data, enacting, approving, or requesting changes. For example, an interface, such as UI 214 may be plugin (although illustrated separately in FIG. 2). For example, it produces data about end user activity, consumes data from many other plugins, and requests changes on behalf of the end user. There could also be an aggregator system plugin that uses a tool like Apache Flink to consume data, process it, and produce aggregations to power browse experiences in the UI 214 or to precompute key metrics for display in an integrated development environment (IDE) or use in other plugins. In various embodiments, plugins may not interact directly with one another and can produce data under shared schemas that can be consumed without needing to depend on a specific implementation. For example, there could be a common schema for a document that describes the new commits being added in a pull request; a UI 214 that visualizes this information would not need to produce a separate implementation for each source control tools supported in application development, build, delivery, and deployment service 210. In other scenarios, proprietary schemas for scenarios with differentiated features can also be implemented.

In various embodiments, control plane 230 may be implemented as a document-oriented control plane to expose the user-configurable parts of the toolchain and to expose data about the resources in the system. As noted above, application development, build, delivery, and deployment service 210 may have a unified front end control plane layer that handles both read and write requests. In the front end, read requests may be forwarded to data management 234 (or to indexes populated from data management 234). Write requests may be accomplished through a "requestChange( )" API, where the caller passes the ID and requested content of a document supported by the system. The change can be evaluated by an extensible set of plugins before being committed, and a variety of provider plugins implemented by product area teams can enact the requested change once it is approved.

A document-oriented control plane 230 helps application development, build, delivery, and deployment service 210 provide a uniform layer where aggregations, provenance tracking, and comprehensive governance controls can be implemented in a consistent and highly generalized way. Developers of a tool 250 can define their resource configurations and data in terms of document schemas, and then the work of aggregating, tracking, or governing these documents can be done by a different tool 250 with minimal coordination after the schema has been established. Additionally, application development, build, delivery, and deployment service 210 may be extensible to meet user needs over the long term; the document schemas provide a natural extension point, because any plugin that produces the required documents or can enact changes using a common schema can be used. For example, given a common set of schemas for source control documents, users could use a built-in source control system or a source control system offered by a different organization or provider (e.g., different from provider network 200 and application development, build, delivery, and deployment service 210) with zero or minimal impact to the rest of the experience.

As noted above, application development, build, delivery, and deployment service 210 uses data management 234 to be a central data management system to allow different tools to share data with one another. Data management 234 may implement a publish/subscribe model, where some plugins write new document versions or events and other plugins can consume them. Data management 234 may implement a subscription system that supports subscriptions to a single document, a document type/schema, or to a grouping of documents (e.g., which may be called a partition). Data management 234 may introduce the concept of partitions to allow document updates to be ordered within a document group; for example, this can be leveraged to build a provenance tracking system where consumers of provenance tracking data will be able to depend on referential integrity within a partition because the publisher has ordered documents in an order where (for example) document creation events come before references to the created document. In addition to provenance tracking, the publish/subscribe system may be used to implement near-real-time aggregation and to populate search indexes and other specialized query engines (such as a graph database).

Data management 234 may not need to contain all data in application development, build, delivery, and deployment service 210 to support the various features discussed above. At the same time, it may have enough data that new projects to produce aggregations or that need to trigger off events coming from the toolchain will be able to satisfy most of their needs from existing documents in data management 234. There may be no firm requirements, in some embodiments, about what data is to be maintained in data management 234, as opposed to being made available through pass-through APIs to tools 250 or other data sources (e.g., data stored in other service(s) 290).

As noted above, control plane 230 that implements features like change control management 232 and data management 234 may provide an extensible and adaptable application development, build, delivery, and deployment service 210. For example, if it were desirable to add a new feature, such as new tool 250 to application development, build, delivery, and deployment service 210, such as a "track changes" feature that allows users to find out where a change is in their continuous delivery (CD) pipeline with integrated context from across the toolchain, the user experience may be designed first. This user experience may might include the presentation of some information and a navigation structure. Then, the API contract between the client and application development, build, delivery, and deployment service 210 (e.g., in a user interface implemented on a client 270, this could be the API that JavaScript would use to get data and push notifications). In the case of track changes, the API would return data with a given schema designed to support the needs of the user experience. This schema could be registered in data management 234.

Next, development of the track changes feature can be made based on example data pushed to data management 234 following this schema. In parallel, an aggregation process can be designed. For track changes, there may need to be some new data produced by the existing feature plugins (e.g. populating a missing identifier) as well as a new aggregation pipeline to take all the data from feature plugins and join them together into a document in the form required by the user experience. These changes can be made in parallel to each feature plugin, and the aggregation can be done as a new analytics application in an analytics service plugin. For each plugin, the process of integrating with data management 214 may be the same: first, the plugin can register a new schema version describing the additional data that would be sent. Then, the plugin can consume new versions of schemas from their dependencies. Finally, a new schema version can be produced in the case of a backwards-incompatible update, this might be a fork of the code for the new tool so that both versions are produced. Data management 234 can ensure that consumers are able to quickly get updates from producers so that the aggregated view can be a near-real-time representation of what is happening in the underlying tools. Finally, the user interface can migrate from its test data set to the real data coming from the aggregation pipeline.

In another example, an update to an existing feature can be made using the extensibility and adaptability provided by control plane 230. For example, if minor update (from a customer experience perspective) were to be made to an existing feature plugin, then new data may need to be provided from the plugin to the client. The process of working with data management 234 can be identical to what goes on for a new feature; working backwards from user experience, any data aggregation layers that are needed may be designed, and new schema versions for the feature plugin may be added. However, in some cases generalizable schema traits can be used further shorten the development process for the update. For example, a new text field input is added to a project, traits in the schema could allow each layer (the aggregation as well as the client plugins) to add user interface treatments to most attributes of the project generically. In some cases, the feature plugin may be able to add a backwards-compatible update with an appropriately decorated schema and have the new information show up in the UI 214 without any work on other tools 250.

Data producers write data to data set management 234, either in the form of an event stream or a set of documents that the producers update over time, in some embodiments. Data producers advertise schemas to which the data they publish is expected (and enforced) to conform. Data consumers can subscribe to events or document updates and retrieve data from data management 234, relying upon a feature of data set management 234 that will return data that's valid according to the advertised schema. Plugins can be both producers and consumers, but in some scenarios not for the same data. For example, text search 252*f* may be a subscriber to various documents events that add, delete, or modify documents in order to make corresponding updates to inverted indexes.

FIG. 3A is an example graphical user interface for specifying an application workflow configuration, according to some embodiments. Workflow interface 300 may be an example of a graphical user interface implemented as part of UI 214 discussed above, and may be utilized to specify an application workflow configuration for executed by workflow execution 252*d*. Workflow interface 300 may implement various user interface elements to provide features for search, editing, modifying, and saving workflows for execution at application development, build, delivery, and deployment service 210. Existing workflows may be searched for and modified, or as indicated at 330, a new workflow may be created.

In some embodiments, various workflow templates, patterns, or other features for assigned workflow generation may be implemented. For example, selection of various user interface elements, like add action(s) 332, add trigger(s) 334, add dependenc(ies) 336, and add compute(s) 338 may be implemented so as to provide walkthroughs, forms, or other interface elements to assist in the creation of a workflow.

As illustrated in FIG. 3A, workflow interface 300 may have an application workflow configuration editor 320, in some embodiments. This text editor may support direct editing of a workflow configuration and may include adding or modifying various statements for assigning computing resources to actions, including the use of shared computing resources, as discussed in detail below. Edits may be saved through the selection of element 342, in some embodiments.

FIG. 3B illustrate examples of application workflow configurations, according to some embodiments. Different types or statements may be used in an application workflow configuration to assist or direct assignment of computing resources to actions. For application workflow configuration 372, a compute statement outside of the actions list may be a default computing resource which may be shared among the actions, whereas an exception to this default sharing may be specified for a particular action, "Action 2" as indicated in the adjacent dependency graph 373. Application workflow configuration 374 illustrates a different example. Instead of explicit resource configuration statements, inherited computing resources assignments by reference, such as inheriting the compute decided for Action 1 at Action 3 and Action 4, as indicated in the adjacent dependency graph 375. As discussed in detail below with regard to FIG. 7, in some embodiments, dynamic optimization may be performed. To enable this dynamic optimization, in some embodiments, a statement, such as ComputeOptimization may be specified as "Enabled". Thus, workflow execution 252d would dynamically and individually assign computing resources to actions, taking into account dependencies as indicated, for example, for "Action 4." A graph 377 illustrates a possible assignment and dependencies that may be made.

Figure 4:
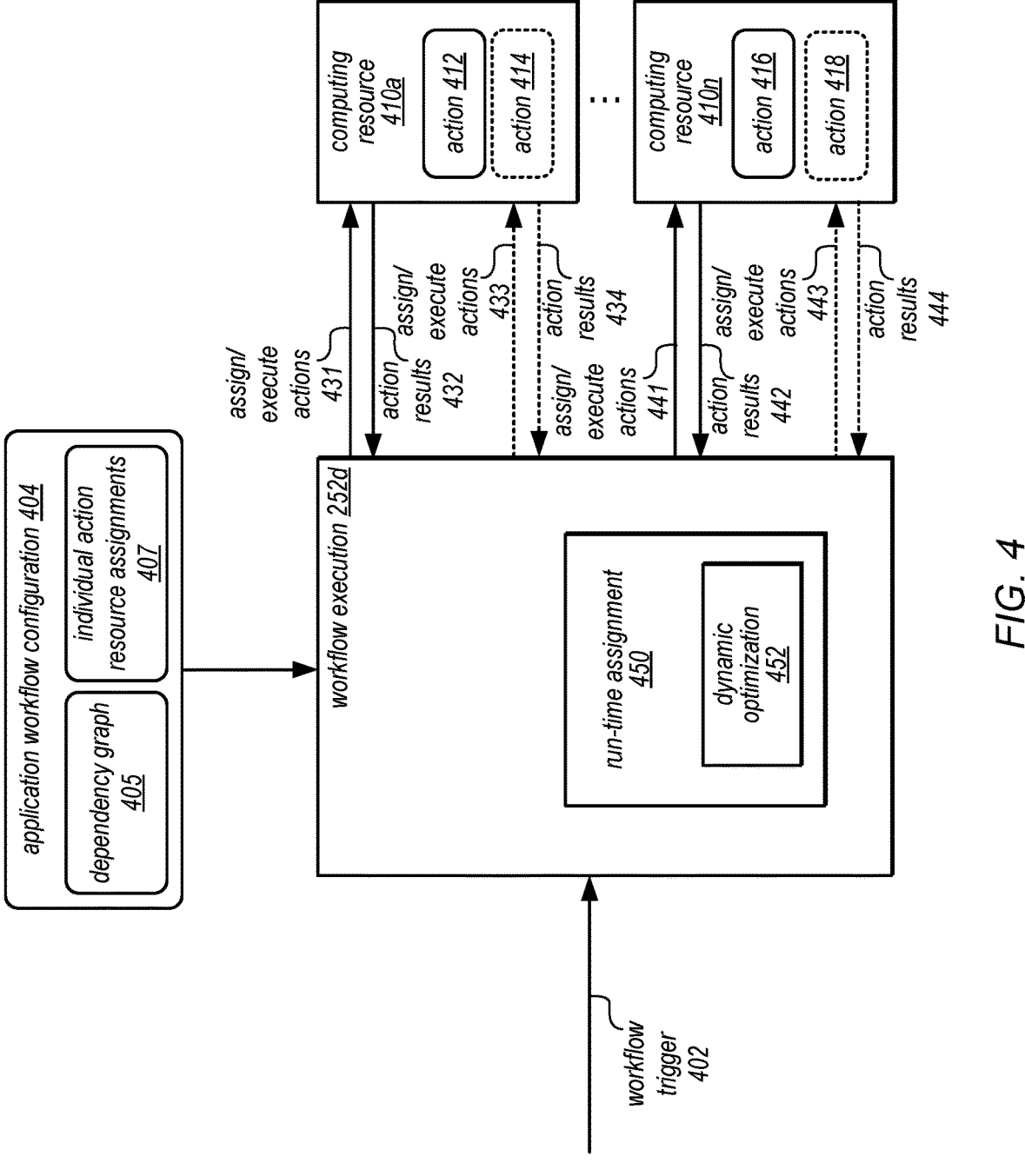
FIG. 4 is a logical block diagram illustrating workflow execution that implements dynamically determining shared computing resources for executing actions, according to some embodiments.

FIG. 4 is a logical block diagram illustrating workflow execution that implements, according to some embodiments. Workflow execution 252d may be implemented as part of application development, build, delivery, and deployment service 210, as noted above with regard to FIG. 2. Workflow execution 252d may perform various workflows submitted on behalf of various clients. Workflow execution 252d may obtain an application workflow configuration 404 and determine, manage, assign, and otherwise direct execution of the various different actions to be performed as part of a workflow described by application workflow configuration 40. For example, a workflow trigger 402 may be provided to workflow execution 252d. This trigger may correspond to a specified trigger in application workflow configuration 404. Workflow execution 252d may then utilize run-time assignment 450 to implement the various different assignment techniques, such as dynamic optimization 452, discussed below with regard to FIGS. 6 and 7, based on the dependencies described in dependency graph 405 and individual action resource assignments 407 present in application workflow configuration 404, to assign and execute various actions with respect to one or more computing resources, which may (or may not) include assignments to a shared computing resource, as indicated by the dotted line interactions and assignments.

For example, workflow execution 252d may send various requests to computing resources 410a through 410n to assign and execute assigned actions, such as actions 412, 414, 416, and 418 respectively according to requests 431, 433, 441, and 443. Results of the actions may be provided from computing resources, as indicated at 432, 434, 442, and 444 in order to determine whether further actions should be performed, results should be shared with other computing resources (or will be shared directly between computing resources).

Figure 5:
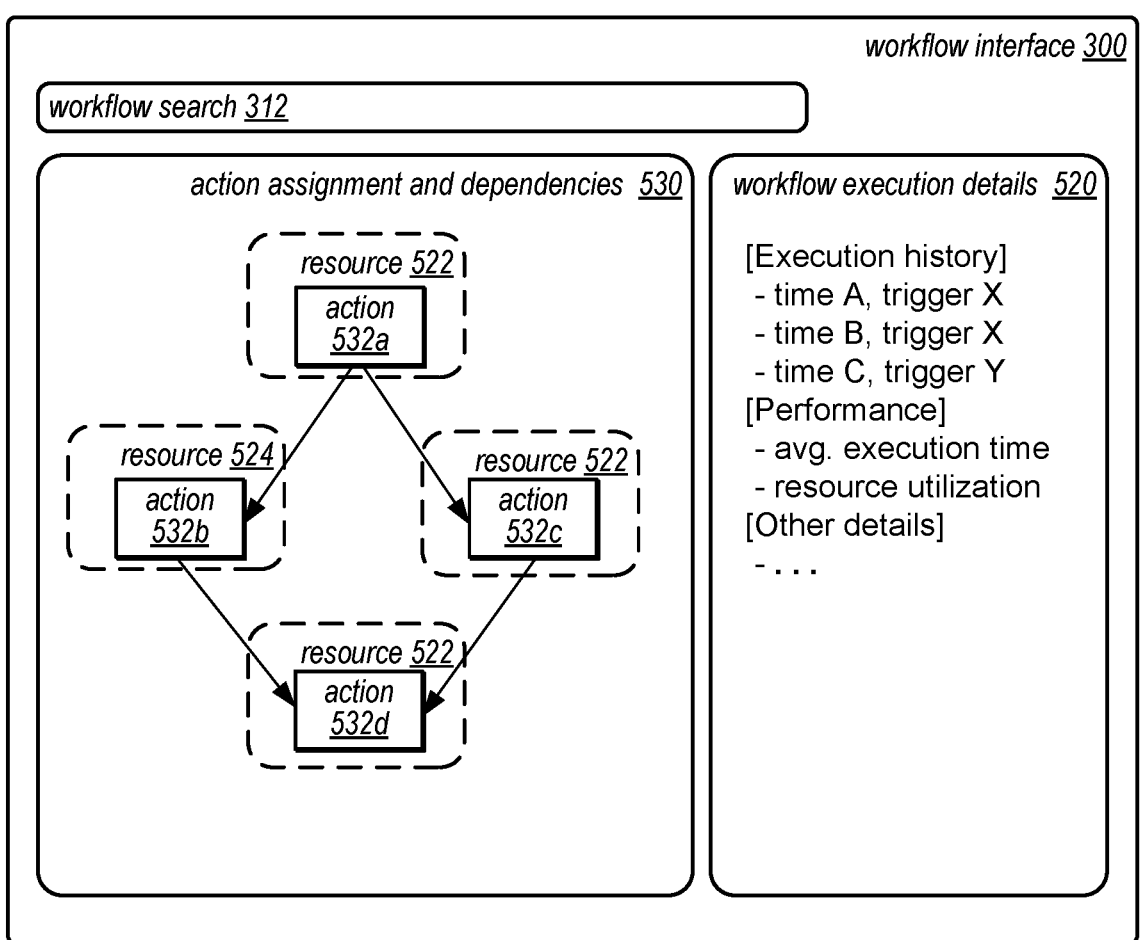
FIG. 5 is an example graphical user interface that displays action computing resource assignments for a workflow, according to some embodiments.

FIG. 5 is an example graphical user interface that displays action computing resource assignments for a workflow, according to some embodiments. Workflow interface 300, as discussed above with regard to FIG. 3A, may also be used to search for the assignment and/or execution history of different workflows. Workflow search element 312 may be used to search or identify executed (or planned execution) of workflows.

An individual workflow may be selected for further detailed display, in some embodiments. For example, action assignments and dependencies may be displayed, as indicated at 530. A graph or other visualization of dependencies and resource assignments may be generated. For instance, as illustrated in FIG. 5, action 532 may have dependent actions 532b and 532c, and action 532d may be dependent on actions 532b and 532c, as indicated by the displayed arrows. Computing resource assignments may also be provided. Thus computing resource 522 may have actions 532a, 532c, and 532d assigned. Computing resource 524 may have a different action, 532b, assigned.

Various workflow execution details 520 may also be displayed, in some embodiments. Such details may include execution history, indicating the time of execution start and, if multiple trigger events are specified, the triggering event, performance information, such as the average execution time of the workflow and resource utilization of the workflow, as well as various other execution details.

The application build, development, delivery, and deployment service 210 discussed in FIGS. 2 through 5 provide examples of a system that may implement workflow management and execution. However, various other types of deployment or development systems may implement such techniques as well as other services or distributed applications which may use shared computing resources determined for executing actions in an application workflow configuration and may take advantage of the above techniques.

Figure 6:
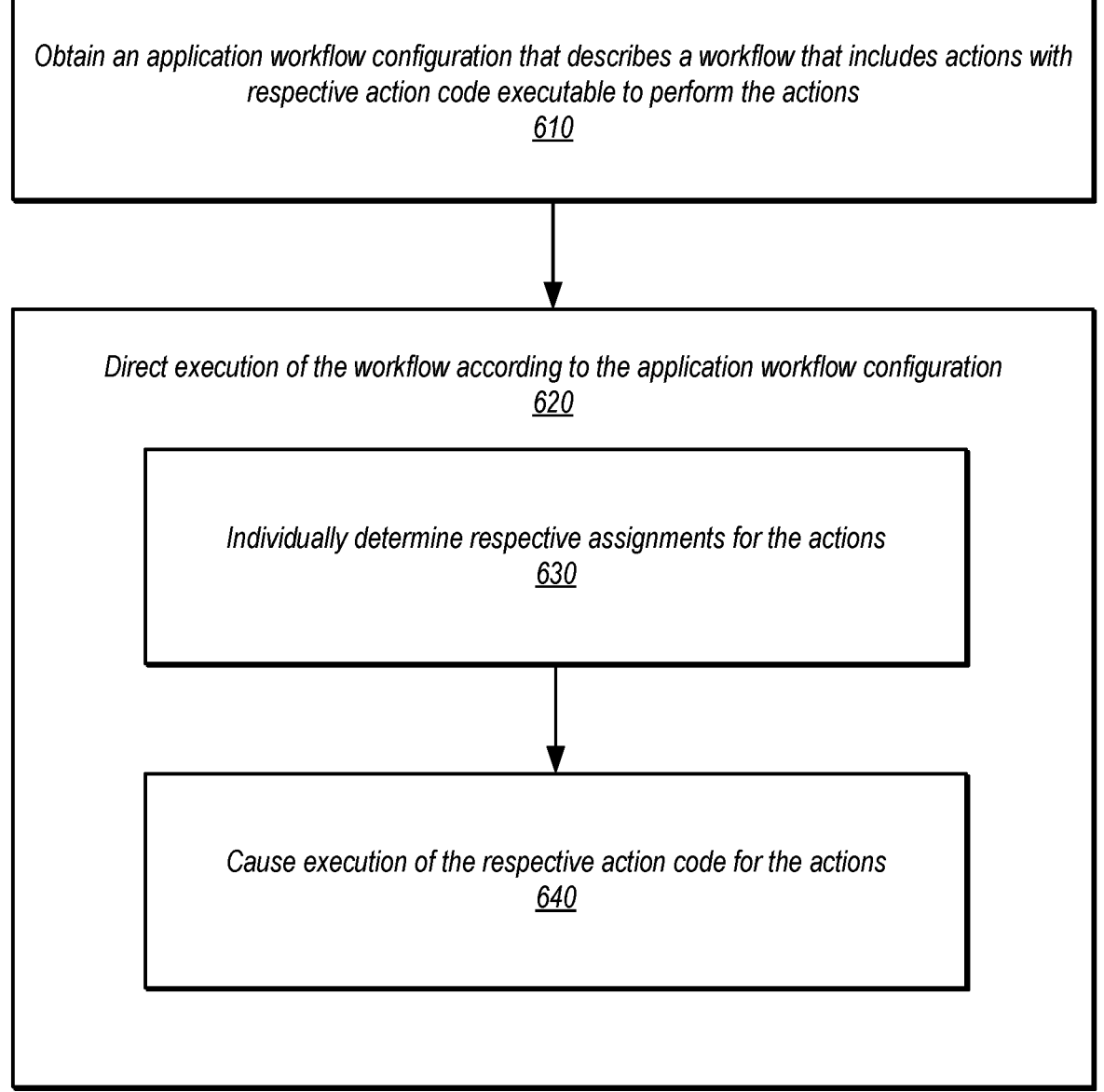
FIG. 6 is a high-level flowchart illustrating various methods and techniques that implement dynamically determining shared computing resources for executing actions in an application workflow configuration, according to some embodiments.

FIG. 6 is a high-level flowchart illustrating various methods and techniques that implement dynamically determining shared computing resources for executing actions in an application workflow configuration, according to some embodiments. Various different systems and devices may implement the various methods and techniques described below, either singly or working together. For example, an application build, development, delivery, and deployment service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 610, an application workflow configuration that describes a workflow that includes actions with respective action code executable to perform the actions may be obtained, in some embodiments. For example, an interface for a workflow management system may support various interfaces to upload, receive, modify, or specify the application workflow configuration. Various different types of the application workflow configuration, as discussed above with regard to FIGS. 3A and 3B, may be obtained, and may be specified in various formats, such as YAML.

As indicated at 620, execution of the workflow may be directed according to the application workflow configuration, according to some embodiments. For example, in some embodiments, the application workflow configuration may specify one (or more) trigger events which may trigger execution of the workflow. These events may be detected by a workflow management system, which may register for, listen for, monitor for, or evaluate various data, either internal to workflow management system or external to workflow management system in order to perform workflow. Events may include the performance of various actions (e.g., related to code development, building, application or deployment in a service like service 210 above, or for other types of workflows, such as requests from a user via an interface to execute the workflow, receipt of messages, notifications, or other communications that initiate execution of the workflow, or various other programmatically detectable events).

As discussed above with regard to FIGS. 1 and 4, various different assignment techniques for actions may be implemented. Some assignments may be directed by the application workflow configuration itself, such as by various statements specifically identifying computing resources (or types of computing resources) to use. A workflow engine may interpret these assignments specified in the application workflow configuration. For example, explicit assignments may be made for specific actions, including sharing of computing resources, or explicit non-sharing of computing resources. Some assignments may be determined by evaluating the dependencies of actions, where dependent actions may utilize same computing resources as those actions upon which they are dependent. As discussed in detail below with regard to FIG. 7, in some embodiments, a workflow or other feature of a workflow management system may automatically determine assignments.

Directing execution of the workflow may include the use of shared computing resources. For example, as indicated at 630, assignments may be individually determined for each action in the workflow at runtime. For example, assignments of two of the actions of a workflow may be assignments to a same computing resource, in some embodiments. Assignments may happen when one (or more) of the actions are executing. As indicated at 640, execution of the respective action code for the actions may be caused according to the respective assignments, in some embodiments. For example, one or more requests to copy, provide, or invoke the action code (e.g., already deployed to or hosted at the assigned computing resource) may be performed. Although some computing resources may be shared, in some scenarios multiple computing resources may be involved in the execution of the workflow and thus one or more different computing resources may be assigned and execute a different one of the actions. In some scenarios, all of the actions may be assigned to and executed on the same computing resource. However, even in such a scenario the determination to make assignments to a same computing resource may be made individually for each resource as the workflow configuration file may make some of the assignments explicitly (e.g., through COMPUTE statements) or through utilizing a dynamic optimization feature.

Workflow execution may continue until the actions specified on the workflow are completed, in various embodiments. In some embodiments, workflow execution may be paused, aborted, or otherwise stopped prior to completion of the actions (e.g., for various other detected events).

Figure 7:
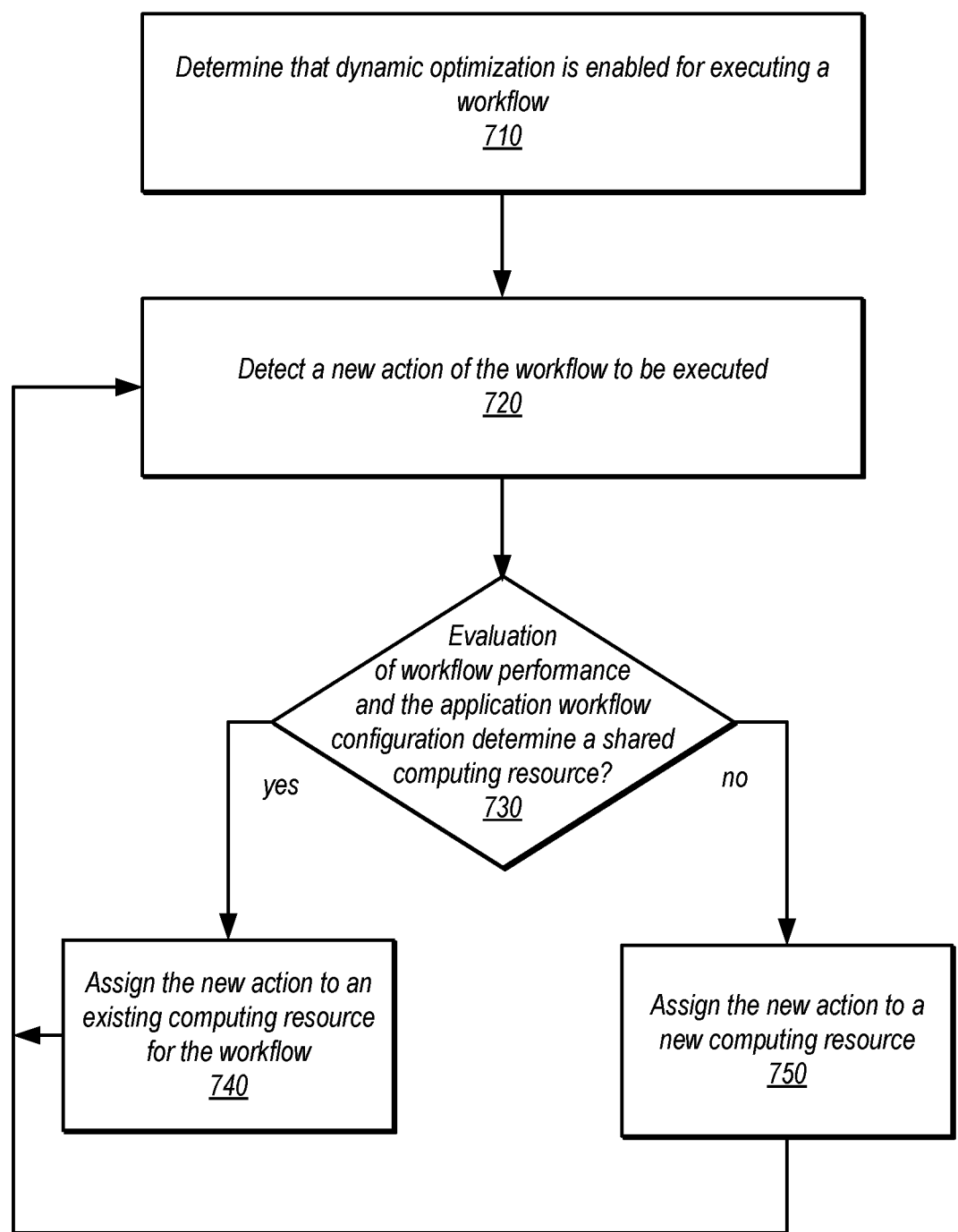
FIG. 7 is a high-level flowchart illustrating various methods and techniques that implement dynamic optimization for selecting computing resources for executing workflows, according to some embodiments.

FIG. 7 is a high-level flowchart illustrating various methods and techniques that implement dynamic optimization for selecting computing resources for executing workflows, according to some embodiments. As indicated at 710, a determination may be made that dynamic optimization is enabled for executing a workflow, in some embodiments. For example, dynamic optimization may be enabled for all workflows by default, in some embodiments, or specified as part of a configuration for an account, organization, other entity that uses a workflow management system. As discussed above with regard to FIG. 3B, in some embodiments, dynamic optimization may be enabled as part of the application workflow configuration itself.

Dynamic optimization may be implemented as part of an execution planning stage for a workflow in some embodiments. For example, available computing resources, estimated action costs, and dependencies between actions may be considered (e.g., by generating and estimating the performance time or other costs of each possible plan) to select one plan that includes computing resource assignments to actions (including shared resource assignments).

In some embodiments, dynamic optimization may be implemented as a runtime optimization. For example, as indicated at 720, a new action of the workflow to be executed may be detected, in some embodiments. For instance, a result or other dependency for the action may be resolved by completion of another action. As indicated at 730, an evaluation of workflow performance and the application workflow configuration may be made to determine whether a shared computing resource is to be used, or a new computing resource is to be used. For example, resource utilization optimization, performance optimization, or various other considerations or optimization objectives may be used to determine from the performance information (e.g., resource usage, time executing, etc.) whether a shared computing resource should be used. If resource conservation is an objective, then the assignment may be made to a shared computing resource, even if that assignment results in a longer execution time for the workflow overall. An alternative objective, performance, may also be used to select a shared resource (e.g., as the cost of data transfer or other delays by using a separate computing resource may outweigh any parallel or other performance benefit from using a different computing resource).

As indicated by the positive exit from 730, the new action may be assigned to an existing computing resource for the workflow, as indicated at 740, if a shared computing resource is determined. If not, then as indicated by the negative exit from 730, the new action may be assigned to a new computing resource, as indicated at 750. For example, a request to provision, invoke, allocate, or otherwise obtain use of the new computing resource may be made, either as part of the assignment of the new action, or as an initialization request or operation performed prior to the execution of the new action, in some embodiments. This technique may repeat during the course of the execution of the workflow until no further actions to assign are detected (not illustrated).

Figure 8:
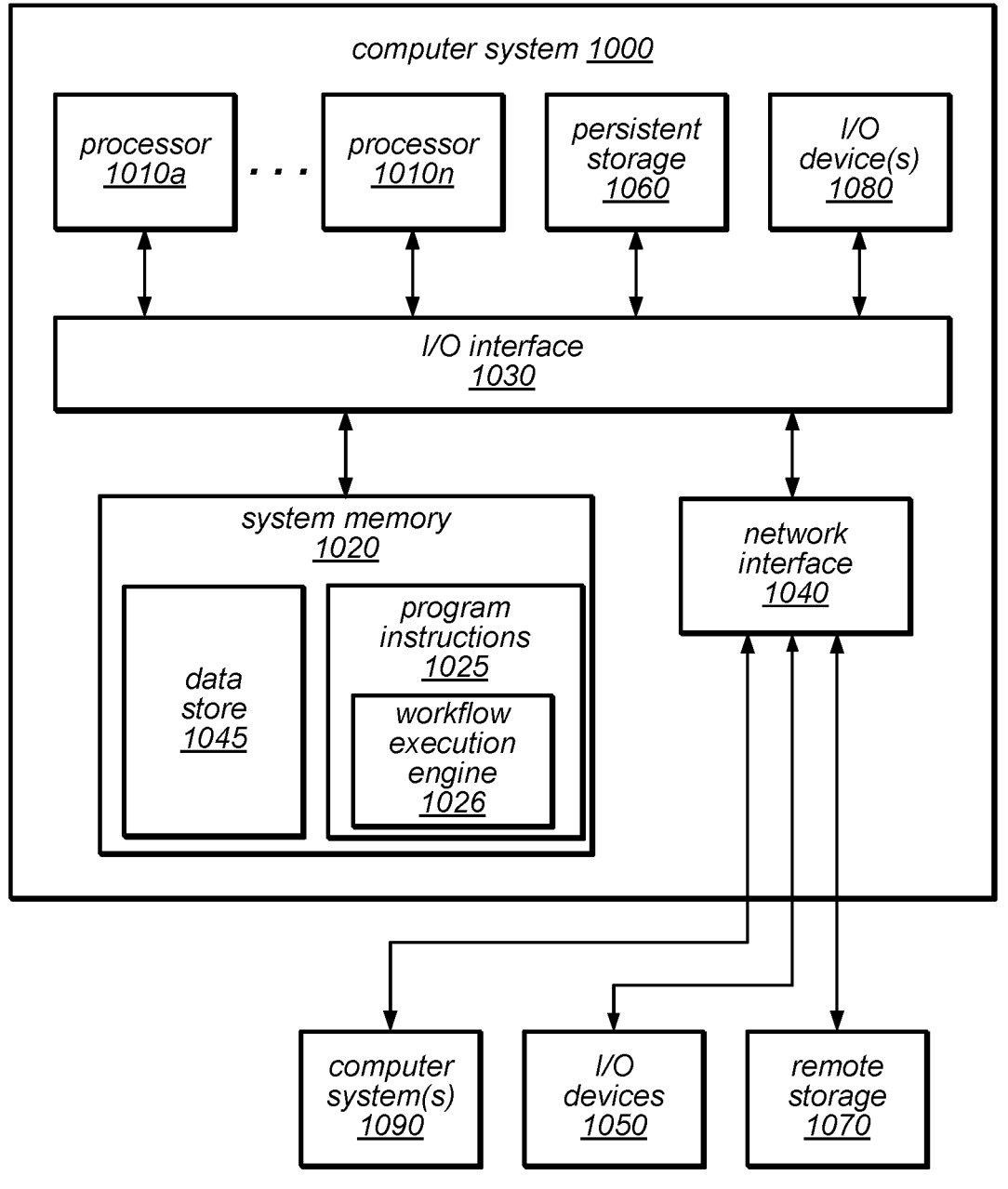
FIG. 8 is a block diagram illustrating an example computer system, according to various embodiments.

Any of various computer systems may be configured to implement dynamically determining shared computing resources for executing actions in an application workflow configuration as discussed with regard to the various figures above. FIG. 8 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 1000 such as that illustrated in FIG. 8 or one or more components of the computer system 1000 that function in a same or similar way as described for the computer system 1000.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, computer system 1000 may be illustrative of servers implementing enterprise logic or downloadable applications, while in other embodiments servers may include more, fewer, or different elements than computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 1020 may store instructions and data accessible by processor 1010. In various embodiments, system memory 1020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for workflow execution engines or other workflow management systems or services, as indicated at 1026, for the downloadable software or provider network are shown stored within system memory 1020 as program instructions 1025. In some embodiments, system memory 1020 may include data store 1045 which may be configured as described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as between a client device and other computer systems, or among hosts, for example. In particular, network interface 1040 may allow communication between computer system 1000 and/or various other device 1060 (e.g., I/O devices). Other devices 1060 may include scanning devices, display devices, input devices and/or other communication devices, as described herein. Network interface 1040 may commonly support one or more wireless networking protocols (e.g., Wi-Fi/IEEE 802.7, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1000 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 1000, including one or more processors 1010 and various other devices (though in some embodiments, a computer system 1000 implementing an I/O device 1050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1000. In general, an I/O device (e.g., cursor control device, keyboard, or display(s) may be any device that can communicate with elements of computing system 1000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:

at least one processor; and a memory, storing program instructions that when executed by the at least one processor, cause the at least one processor to implement an application development, build, delivery, and deployment service, configured to:

receive, via an interface of the application development, build, delivery, and deployment service, one or more requests to specify a workflow in an application workflow configuration that describes the workflow, wherein the workflow comprises a plurality of actions with respective action code executable to perform the plurality of actions and an event that triggers execution of the workflow;

detect the event that triggers execution of the workflow;

direct execution of the workflow according to the application workflow configuration, wherein to direct execution of the workflow, the application development, build, delivery, and deployment service is configured to:

evaluate a first action of the plurality of actions specified in the workflow configuration to determine an assignment for the first action when a second action of the plurality of actions is executing according to a previously determined assignment specific to the second action as part of individual determinations of respective assignments for the plurality of actions at runtime of the workflow, wherein the individual determination for at least two of the plurality of actions are assignments to a same computing resource; and cause execution of the respective action code for the plurality of actions according to the respective assignments.

2. The system of claim 1, wherein to perform the individual determinations of the respective assignments for the plurality of actions, the application development, build, delivery, and deployment service is configured to:

detect one of the two actions as a new action to be executed;

evaluate performance of the workflow and the application workflow configuration to determine a shared computing resource for the new action; and identify the same computing resource as the shared computing resource to assign the new action.

3. The system of claim 1, wherein to perform the individual determinations of the respective assignments for the plurality of actions, the application development, build, delivery, and deployment service is configured to determine that the respective assignments of the computing resource to the two actions are specified in the application workflow configuration.

4. The system of claim 1, wherein the application development, build, delivery, and deployment service is further configured to display, via the interface of the application development, build, delivery, and deployment service, respective assignments of the plurality of actions to a computing resource, including the assignment of the at least two actions to the same computing resource.

5. A method, comprising:

obtaining, by workflow execution engine for a workflow management system, an application workflow configuration that describes a workflow comprising a plurality of actions with respective action code executable to perform the plurality of actions;

directing, by the workflow execution engine, execution of the workflow according to the application workflow configuration, wherein the directing comprises:

evaluating a first action of the plurality of actions specified in the workflow configuration to determine an assignment for the first action when a second action of the plurality of actions is executing according to a previously determined assignment specific to the second action as part of individual determinations of respective assignments for the plurality of actions at runtime of the workflow, wherein the individual determinations for at least two of the plurality of actions are assignments to a same computing resource; and causing execution of the respective action code for the plurality of computing actions according to the respective assignments.

6. The method of claim 5, wherein the individual determinations the respective assignments for the plurality of actions comprises:

detecting one of the two actions as a new action to be executed;

evaluating performance of the workflow and the application workflow configuration to determine a shared computing resource for the new action; and identifying the same computing resource as the shared computing resource to assign the new action.

7. The method of claim 6, further comprising determining that dynamic optimization for assigning computing resources is enabled for execution of the workflow in the application workflow configuration.

8. The method of claim 5, wherein the individual determinations the respective assignments for the plurality of actions comprises determining that that the respective assignments of the computing resource to the two actions are specified in the application workflow configuration.

9. The method of claim 5, wherein the application workflow configuration includes respective dependencies between the plurality of actions.

10. The method of claim 5, further comprising receiving one or more requests, via an interface of the workflow management system, that specifies the application workflow configuration.

11. The method of claim 5, wherein the individual determinations the respective assignments for the plurality of actions further comprises:

determining an assignment of third one of the plurality of actions to a different computing resource; and causing execution of the respective action code for the third action according to the assignment to the different computing resource.

12. The method of claim 5, wherein the individual determinations the respective assignments for the plurality of actions is based on a computing resource capability determined to be provided by the same computing resource.

13. The method of claim 5, further comprising displaying, via an interface of the workflow management system, the respective assignments of the plurality of actions to a computing resource, including the assignment of the at least two actions to the same computing resource.

14. One or more non-transitory, computer-readable storage media, storing program instructions that when executed on or across one or more computing devices cause the one or more computing devices to implement:

detecting an event that triggers execution of a workflow according to an application workflow configuration that describes the workflow, wherein the workflow comprises a plurality of actions with respective action code executable to perform the plurality of actions;

directing execution of the workflow according to the application workflow configuration, wherein the directing comprises:

evaluating a first action of the plurality of actions specified in the workflow configuration to determine an assignment for the first action when a second action of the plurality of actions is executing according to a previously determined assignment specific to the second action as part of individual determinations of respective assignments for the plurality of actions at runtime of the workflow, wherein the respective determinations for at least two of the plurality of actions are assignments to a same computing resource; and causing execution of the respective action code for plurality of actions according to the respective.

15. The one or more non-transitory, computer-readable storage media of claim 14, wherein, in performing the individual determinations the respective assignments for the plurality of actions, the program instructions cause the one or more computing devices to implement:

detecting one of the two actions as a new action to be executed;

evaluating performance of the workflow and the application workflow configuration to determine a shared computing resource for the new action; and identifying the same computing resource as the shared computing resource to assign the new action.

16. The one or more non-transitory, computer-readable storage media of claim 14, wherein, in performing the individual determinations the respective assignments for the plurality of actions, the program instructions cause the one or more computing devices to implement determining that an assignment of the computing resource to the two actions is specified in the application workflow configuration.

17. The one or more non-transitory, computer-readable storage media of claim 14, storing further program instructions that when executed on or across the one or more computing devices, cause the one or more computing devices to further implement displaying, via an interface, the respective assignments of the plurality of actions to a computing resource, including the assignment of the at least two actions to the same computing resource.

18. The one or more non-transitory, computer-readable storage media of claim 14, wherein the application workflow configuration includes respective dependencies between the plurality of actions.

19. The one or more non-transitory, computer-readable storage media of claim 18, wherein the assignment of the at least two actions to the same computing resource is determined according to an inherited assignment for at least one of the two actions determined according to the respective dependencies between the plurality of actions in the application workflow configuration.

20. The one or more non-transitory, computer-readable storage media of claim 14, wherein the one or more computing devices are implemented as part of an application development, build, delivery, and deployment service offered by a provider network.

* * * * *